United States Patent Office 3,850,926
Patented Nov. 26, 1974

3,850,926
2-(N-SUBSTITUTED-PHENYLAMINO)-
IMIDAZOLINES-(2)
Helmut Stähle, Herbert Köppe, Werner Kummer, and
Helmut Wick, Ingelheim am Rhein, Germany, assignors
to Boehringer Ingelheim G.m.b.H., Ingelheim am
Rhein, Germany
No Drawing. Continuation-in-part of abandoned application Ser. No. 219,535, Jan. 20, 1972. This application
Aug. 21, 1972, Ser. No. 282,357
Claims priority, application Germany, Jan. 21, 1971,
P 21 02 733.8; Feb. 23, 1972, P 22 08 434.0
The term of this patent subsequent to Jan. 2, 1990,
has been disclaimed
Int. Cl. C07d 49/34
U.S. Cl. 260—253                         7 Claims

ABSTRACT OF THE DISCLOSURE

Compounds of the formula

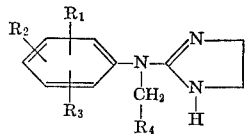

wherein $R_1$, $R_2$ and $R_3$, which may be identical to or different from each other, are each hydrogen, fluorine, chlorine, bromine, methyl, ethyl, methoxy, trifluoromethyl or cyano, and
$R_4$ is

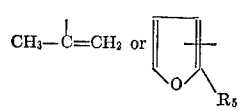

where $R_5$ is hydrogen, methyl or ethyl, and non-toxic, pharmacologically acceptable acid addition salts thereof; the compounds as well as their salts are useful as analgesics and hypotensives.

This is a continuation-in-part of copending application Ser. No. 219,535, filed January 20, 1972, now abandoned.

This invention relates to novel 2-(N-substituted-phenylamino)-imidazolines-(2) and non-toxic acid addition salts thereof, as well as methods of preparing these compounds.

More particularly, the present invention relates to a novel class of 2-phenylamino-imidazoline-(2) derivatives represented by the formula

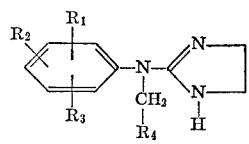

wherein $R_1$, $R_2$ and $R_3$, which may be identical to or different from each other, are each hydrogen, fluorine, chlorine, bromine, methyl, ethyl, methoxy, trifluoromethyl or cyano, and
$R_4$ is

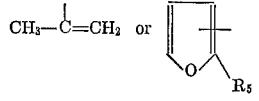

where $R_5$ is hydrogen, methyl or ethyl, and non-toxic, pharmacologically acceptable acid addition salts thereof.

A sub-genus thereunder is constituted by compounds of the formula I, wherein $R_1$ and $R_2$ are each hydrogen, fluorine, chlorine, bromine, methyl or ethyl,
$R_3$ is hydrogen or bromine, and
$R_4$ is

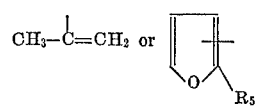

where $R_5$ is hydrogen, methyl or ethyl, and non-toxic, pharmacologically acceptable acid addition salts thereof.

The compounds embraced by formula I may be prepared by the following methods:

METHOD A

By reacting a 2-phenylamino-imidazoline-(2) of the formula

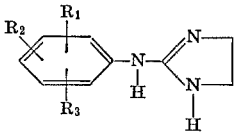

wherein $R_1$, $R_2$ and $R_3$ have the same meanings as in formula I, with a halide of the formula

wherein $R_4$ has the same meanings as in formula I and
Hal is chlorine, bromine or iodine.

METHOD B

By reacting a tertiary phenylamine of the formula

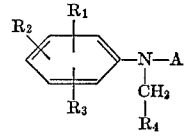

wherein $R_1$, $R_2$, $R_3$ and $R_4$ have the same meanings as in formula I, and
A is cyano or

where Y is alkoxy of 1 to 4 carbon atoms, alkylthio of 1 to 4 carbon atoms, sulfhydryl or primary amino, with ethylenediamine or an acid addition salt thereof.

Upon alkylation of a 2-phenylamino-imidazoline-(2) of the formula II pursuant to method A, the substitution takes place exclusively at the bridge nitrogen atom, which can be proven by means of NMR-spectroscopy. Thus, if the substitution takes place at the bridge nitrogen atom, the methylene protons of the imidazoline ring will appear as a singulett at about 6 p.p.m. (τ-scale).

The structure of the end product obtained in the reaction pursuant to method B is fixed by the synthesis.

The reaction in methods A and B is advantageously performed by heating the reactants to a temperature of about 50 to 150° C., optionally in the presence of an organic solvent. The optimum reaction conditions depend largely upon the reactivity of the reactants and may be accurately determined by preliminary tests.

In the alkylation reaction pursuant to method A, it is preferred to provide the halide reactant of the formula III in excess over and above the stoichiometrically required amount and to perform the reaction in the presence of an acid-binding agent, such as triethylamine.

In the reaction according to method B it is also advantageous to provide the ethylenediamine or the acid addition salt thereof in excess over and above the stoichiometrically required amount.

The compounds of the formula I are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, valeric acid, caproic acid, capric acid, oxalic acid, malonic acid, succinic acid, glutaric acid, maleic acid, fumaric acid, lactic acid, tartaric acid, citric acid, malic acid, gluconic acid, galacturonic acid, benzoic acid, p-hydroxybenzoic acid, phthalic acid, cinnamic acid, salicylic acid, ascorbic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

2-[N-(2',6'-Dichloro-phenyl)-N-(β-methallyl)-amino]-imidazoline-(2) by method A

A mixture consisting of 6.9 gm. (0.03 mol) of 2-(2',6'-dichlorophenyl-amino)-imidazoline-(2), 15 ml. of 3-chloro-2-methyl-1-propene and 25 ml. of absolute methanol was heated in a closed tube on a boiling water bath for 24 hours. Thereafter, the reaction mixture was evaporated in vacuo, the residue was dissolved in dilute hydrochloric acid, and the resulting solution was repeatedly extracted with ether (the ether extracts were discarded), purified over activated charcoal and neutralized with 5 N sodium hydroxide. The oily precipitate formed thereby crystallized after standing for some time and was then collected by vacuum filtration, washed with water and a small amount of ether, and dried. 4.7 gm. (55.0% of theory) of the thin-layer-chromatographically pure compound, m.p. 111–112° C., of the formula

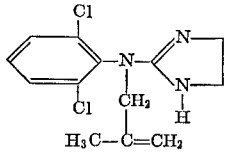

were obtained.

EXAMPLE 2

Using a procedure analogous to that described in Example 1, 33.0% of theory of 2-[N-(2'-methyl-4'-chlorophenyl) - N - (β - methallyl)-amino]-imidazoline-(2), m.p. 78–79° C., of the formula

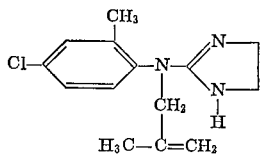

was obtained from 2-[(2'-methyl - 4' - chloro-phenyl)-amino] - imidazoline-(2) and 3 - chloro - 2 - methyl-1-propene.

EXAMPLE 3

Using a procedure analogous to that described in Example 1, 66.0% of theory of 2-[N-(2'-chloro - 6' - methyl-phenyl) - N - (β - methallyl) - amino] - imidazoline-(2), m.p. 96–97° C., was obtained from 2-[(2' - chloro - 6'-methyl - phenyl) - amino] - imidazoline-(2) and 3-chloro-2-methyl-1-propene.

EXAMPLE 4

Using a procedure analogous to that described in Example 1, 44.4% of theory of 2-[N-(2'-chloro-4'-methylphenyl) - N - (β - methallyl)-amino]-imidazoline-(2), m.p. 88–89° C., was obtained from 2-[(2' - chloro-4'-methyl-phenyl)-amino]-imidazoline-(2) and 3-chloro-2-methyl-1-propene.

EXAMPLE 5

Using a procedure analogous to that described in Example 1, 33.0% of theory of 2-[N-(2'-methyl-5'-fluorophenyl) - N - (β-methallyl)-amino]-imidazoline-(2), m.p. 55–57° C., of the formula

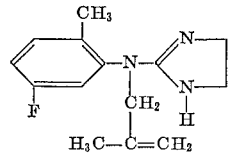

was obtained from 2-[(2' - methyl - 5' - fluoro-phenyl)-amino]-imidazoline-(2) and 3-chloro-2-methyl-1-propene.

EXAMPLE 6

Using a procedure analogous to that described in Example 1, 50.5% of theory of 2-[N-(2'-chloro-3'-methylphenyl) - N - (β - methallyl)-amino]-imidazoline-(2), m.p. 59–62° C., was obtained from 2-[(2' - chloro-3'-methyl-phenyl) - amino]-imidazoline-(2) and 3-chloro-2-methyl-1-propene.

EXAMPLE 7

Using a procedure analogous to that described in Example 1, 30.0% of theory of 2-[N-(2',6'-diethyl-phenyl)-N-(β-methallyl)-amino]-imidazoline-(2), a non-distillable oil, of the formula

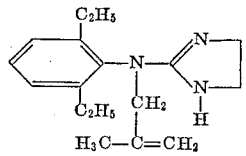

was obtained from 2-[(2',6'-diethyl-phenyl)-amino]-imidazoline-(2) and 3-chloro-2-methyl-1-propene.

EXAMPLE 8

Using a procedure analogous to that described in Example 1, 40.0% of theory of 2 - [N - (2',4',6'-tribromo-phenyl)-N-(β - methallyl)-amino]-imidazoline-(2), m.p. 175–176° C., of the formula.

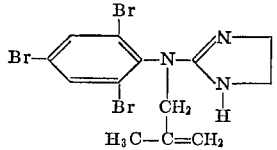

was obtained from 2-[(2',4',6'-tribromo-phenyl)-amino]-imidazoline-(2) and 3-chloro-2-methyl-1-propene.

EXAMPLE 9

2-[N-(2'-Methyl-furylmethyl-3')-N-(2'',6''-dichlorophenyl)-amino]-imidazoline-(2) by Method A A mixture consisting of 2.3 gm. (0.01 mol) of 2-[(2',6'-dichloro-phenyl)-amino]-imidazoline-(2), 1.43 gm. of 3-chloromethyl-2-methyl-furan, 3 ml. of triethylamine and 25 ml. of absolute toluene was refluxed for three hours. Thereafter, the reaction solution was cooled on an ice bath, the precipitate formed thereby was collected by filtration and then dissolved in 1 N hydrochloric acid, and the resulting solution was made alkaline with 2 N sodium hydroxide and then repeatedly extracted with ether. The combined ethereal extracts were dried over anhydrous magnesium sulfate, and the ether was evaporated in vacuo. The initially viscous oily residue crystallized upon standing for some time, and was then stirred briefly with petroleum ether (40–80° C.), collected by vacuum filtration, washed with petroleum ether and dried. 1.95 gm. (60.2% of theory) of the compound, m.p. 96–98° C., of the formula

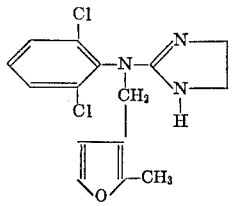

were obtained. The compound is soluble in methanol, ethanol and ether, but insoluble in water. In the form of its hydrochloride, it is also soluble in an equivalent amount of dilute hydrochloric acid.

The position of the 2-methyl-furylmethyl-3 radical on the bridge nitrogen atom of the 2-phenylamino-imidazoline-(2) structure is confirmed by virtue of the singulett of the four methylene protons of the imidazoline ring at about 6.5 p.p.m. ($\tau$-scale) of the NMR-spectrum.

EXAMPLE 10

2-[N-(2'-Ethyl-furylmethyl-3')-N-(2'',6''-dichloro-phenyl)-amino]-imidazoline-(2)

A mixture consisting of 2.3 gm. (0.01 mol) of 2-[(2',6'-dichloro-phenyl)-amino]-imidazoline-(2), 1.58 gm. (0.011 mol) of 3-chloromethyl-2-ethyl-furan, 3 ml. of triethylamine and 25 ml. of absolute toluene was refluxed for five hours. Thereafter, the reaction solution was cooled on an ice bath, and the precipitate formed thereby was collected by vacuum filtration, washed with toluene and petroleum ether, and dissolved in dilute hydrochloric acid. The resulting solution was repeatedly extracted with ether, the combined ethereal extracts were dried over anhydrous magnesium sulfate, and the ether was evaporated in vacuo. The initially viscous oily residue crystallized throughout upon standing for some time, yielding 1.8 gm. (53.2% of theory) of the pure compound of the formula

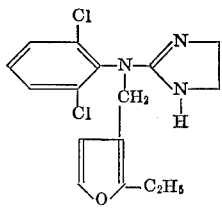

having a melting point of 96–98° C.

The above structure of the product is confirmed by the NMR-spectrum which shows a singulett at about 6.5 p.p.m. ($\tau$-scale) for the four methylene protons of the imidazoline ring.

EXAMPLE 11

2-[N-(Furylmethyl-3')-N-(2'',6''-dichloro-phenyl)-amino]-imidazoline-(2) by Method A A mixture consisting of 2.3 gm. (0.01 mol) of 2-[(2',6'-dichloro - phenyl) - amino]-2-imidazoline-(2), 1.3 gm. (0.011 mol) of 3-chloromethyl-furan, 3 ml. of triethylamine and 25 ml. of absolute toluene was refluxed for three hours. Thereafter, the reaction solution was evaporated to dryness in vacuo, and the residue was dissolved in 1 N hydrochloric acid. The resulting solution was fractionally extracted with ether at gradually increasing pH-values to separate the reaction product from unreacted starting material and impurities. Those ethereal extract fractions which contained the desired reaction product (determined by thin-layer chromatography on silicagel in the system benzene:dioxane:ethanol:conc ammonia =50:40:5:5; dye: Potassium iodine platinate) were combined, dried over anhydrous magnesium sulfate, and evaporated in vacuo, yielding 1.1 gm. (35.5% of theory) of the compound, m.p. 126–127° C., of the formula

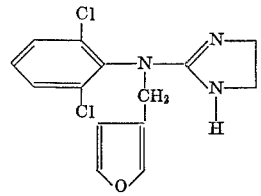

EXAMPLE 12

2-[N-(Furylmethyl-2')-N-(2'',6''-dichloro-phenyl)-amino]-imidazoline-(2) by method A A mixture consisting of 3.35 gm. (0.015 mol) of 2-[(2',6'-dichloro-phenyl)-amino]-imidazoline-(2), 2.1 gm. (0.0165 mol) of furfuryl chloride, 4.5 ml. of triethylamine and 40 ml. of absolute toluene was refluxed for three hours. Thereafter, the reaction mixture was cooled on an ice bath, and the precipitate formed thereby was collected and dissolved in 1 N hydrochloric acid. The acid solution was repeatedly extracted with ether to remove unreacted starting material and impurities, and the ethereal extracts were discarded. Subsequently, the solution was fractionally extracted at gradually increasing pH-values (buffered with 2 N sodium hydroxide) with batches of ether. Those ethereal extract fractions which were found to be thin-layer-chromatographically uniform were combined, dried over anhydrous magnesium sulfate, and evaporated to dryness in vacuo, leaving as a residue an oil which crystallized throughout upon standing for a short period of time. 1.7 gm. (36.6% of theory) of the white crystalline compound, m.p. 116–118° C., of the formula

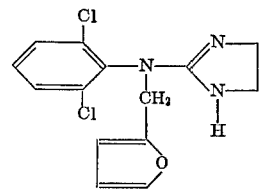

were obtained.

The product was thin-layer-chromatographically uniform; it is soluble in an equivalent amount of dilute hydrochloric acid, as well as in ethanol, methanol, chloroform and ether, but insoluble in water.

EXAMPLE 13

Using a procedure analogous to that described in Example 12, 13.8% of theory of 2-[N-furfuryl-N-(2'-chloro-4'-methyl - phenyl)-amino]-imidazoline-(2), m.p. 108–110° C., was obtained from 2-[(2'-chloro-4'-methyl-phenyl)-amino]-imidazoline-(2) and furfuryl chloride.

EXAMPLE 14

Using a procedure analogous to that described in Example 12, 44.9% of theory of 2-[N-furfuryl-N-(2'-chloro-6'-methyl-phenyl)-amino]-imidazoline-(2), m.p. 97–99° C., was obtained from 2-[(2'-chloro-6'-methyl-phenyl)-amino]-imidazoline-(2) and furfuryl chloride.

EXAMPLE 15

2-[N-(2'-Methyl-furylmethyl-3')-N-(2'',4''-dichloro-phenyl)-amino]-imidazoline-(2) by method A A mixture consisting of 4.6 gm. (0.02 mol) of 2-[(2',6'-dichloro-phenyl)-amino]-imidazoline-(2), 2.86 gm. (110 percent of stoichiometric amount) of 3-chloromethyl-2-methyl-furan, 6 ml. of triethylamine and 50 ml. of absolute toluene was refluxed for four hours, while stirring.

After cooling the reaction mixture, the precipitate formed thereby was collected by filtration, dissolved in methanol, and the solution was alkalized with potassium hydroxide. The resulting oily imidazoline base was separated by centrifugation, taken up in ether, and the ether solution was purified by extraction with water. The ether extract was dried over anhydrous magnesium sulfate, and the ether was evaporated in vacuo. The initially viscous oily residue crystallized upon standing for some time. 3.5 gm. (57.7% of theory) of the pure compound, m.p. 58–60° C. of the formula

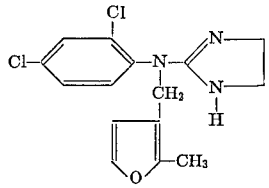

were obtained.

EXAMPLE 16

Using a procedure analogous to that described in Example 15, 41.2% of theory of 2-[N-(2'-methyl-furylmethyl-3'-N - (2" - chloro-6"-methyl-phenyl) - amino]-imidazoline-(2), m.p. 74.5–76.5° C. was obtained from 2-[(2' - chloro - 6' - methyl-phenyl)-amino]-imidazoline-(2) and 3-chloromethyl-2-methyl-furan.

EXAMPLE 17

Using a procedure analogous to that described in Example 15, 55.8% of theory of 2-[N-(2'-methyl-furyl-methyl-3'-N - (2",6" - dichloro-4"-bromo-phenyl)-amino]-imidazoline-(2), m.p. 181–183° C., was obtained from 2-[(2',6'-dichloro - 4' - bromophenyl)-amino]-imidazoline-(2)- and 3-chloromethyl-2-methyl-furan.

EXAMPLE 18

Using a procedure analogous to that described in Example 15, 27.0% of theory of 2-[N-(2'-methyl-furylmethyl-3') - N - (2",5"-dimethoxy-phenyl)-amino]-imidazoline-(2), viscous oil, was obtained from 2-[2',5'-dimethoxy-phenyl)-amino]-imidazoline-(2) and 3-chloromethyl-2-methyl-furan.

EXAMPLE 19

Using a procedure analogous to that described in Example 15, 25.7% of theory of 2-[N-(2'-methyl-furyl-methyl-3') - N - (2",5"-difluoro-phenyl)-amino]-imidazoline-(2), viscous oil, was obtained from 2-[(2',5'-difluoro-phenyl)-amino] - imidazoline - (2) and 3-chloromethyl-2-methyl-furan.

EXAMPLE 20

Using a procedure analogus to that described in Example 15, 45.4% of theory of 2-[N-(2'-methyl-furylmethyl-3') - N - (2"-trifluoromethyl-phenyl)-amino]-imidazoline-(2), oil, was obtained from 2-[(2'-trifluoromethyl-phenyl)-amino]-imidazoline-(2) and 3-chloromethyl-2-methyl-furan.

EXAMPLE 21

Using a procedure analogous to that described in Example 15, 31.3% of theory of 2-[N-(2'-methyl-furylmethyl-3')-N-phenyl-amino]-imidazoline-(2), oil, was obtained from 2 - phenylamino - imidazoline-(2) and 3-chloromethyl-2-methyl-furan.

EXAMPLE 22

Using a procedure analogous to that described in Example 15, 8.6% of theory of 2-[N-(2'-methyl-furylmethyl-3')-N-(4"-cyano-phenyl)-amino]-imidazoline - (2), m.p. 159–161° C. was obtained from 2-[(4'-cyano-phenyl)-amino]-imidazoline-(2) and 3-chloromethyl-2-methyl-furan.

EXAMPLE 23

Using a procedure analogous to that described in Example 15, 48.1% of theory of 2-[N-(2'-methyl-furylmethyl-3')-N-(2",6"-diethyl-phenyl) - amino] - imidazoline-(2), m.p. 79–82° C., was obtained from 2-[(2',6'-diethyl-phenyl)-amino] - imidazoline - (2) and 3-chloromethyl-2-methyl-furan.

EXAMPLE 24

Using a procedure analogous to that described in Example 15, 52.7% of theory of 2-[N-(2'-methyl-furylmethyl-3') - N - (2"-chloro - 3" - methyl-phenyl)-amino]-imidazoline-(2), m.p. 70–73° C. was obtained from 2-[(2'-chloro - 3 - methyl-phenyl)-amino]-imidazoline-(2) and 3-chloromethyl-2-methyl-furan.

EXAMPLE 25

Using a procedure analogous to that described in Example 15, 40.0% of theory of 2-[N-(2'-methyl-furylmethyl-3') - N - (2"-methyl-5"-fluoro-phenyl)-amino]-imidazoline-(2), viscous oil, was obtained from 2-[(2'-methyl-5'-fluoro-phenyl) - amino] - imidazoline-(2) and 3-chloromethyl-2-methyl-furan.

EXAMPLE 26

Using a procedure analogous to that described in Example 15, 50.3% of theory of 2-[N-(2'-methyl-furyl-methyl-3') - N - (2"-methyl-5"-chloro-phenyl)-amino]-imidazoline-(2), oil, was obtained from 2-[(2'-methyl-5'-chloro-phenyl(-amino] - imidazoline - (2) and 3-chloromethyl-2-methyl-furan.

EXAMPLE 27

Using a procedure analogous to that described in Example 15, 43.6% of theory of 2-[N-furfuryl-N-(2"-chloro-phenyl)-amino]-imidazoline-(2), oil, was obtained from 2-[(2' - chloro - phenyl)-amino]-imidazoline-(2) and furfuryl chloride.

EXAMPLE 28

Using a procedure analogous to that described in Example 15, 37.0% of theory of 2-[N-furfuryl-N-(2",4"-dichloro-phenyl)-amino]-imidazoline-(2), m.p. 97–99° C., was obtained from 2-[(2',4'-dichloro-phenyl)-amino]-imidazoline-(2) and furfuryl chloride.

EXAMPLE 29

Using a procedure analogous to that described in Example 15, 27.6% of theory of 2-[N-furfuryl-N-(2"-chloro-3" - methyl - phenyl)-amino]-imidazoline-(2), m.p. 97–99° C., was obtained from 2-[2'-chloro-3'-methyl-phenyl-amino]-imidazoline-(2) and furfuryl chloride.

EXAMPLE 30

2-[N-(2' - Methyl - furylmethyl - 3')-N-(2"-chloro-4"-methyl-phenyl)-amino]-imidazoline-(2) by Method B 10.9 gm. (0.025 mol) of N-(2"-chloro-4"-methyl-phenyl)-N-(2' - methyl - furylmethyl-3')-S-methyl-isothiouronium iodide [prepared by reaction of N-(2'-chloro-4'-methyl-phenyl)-S-methyl-isothiouronium iodide with 2-methyl-3-chloromethyl-furan] and 2.5 ml. of 98 percent ethylene-diamine were heated for 15 minutes to 165–170° C., while stirring. Thereafter the reaction solution was cooled to room temperature and worked up using the procedure described in Example 12 yielding 4.7 gm. (62.0% of theory) of the crystalline compound. The melting point of a sample purified by chromatography at $Al_2O_3$ using chloroform is 85–87° C.

EXAMPLE 31

2-[N-(2-Methyl-furylmethyl-3')-N-(2",6"-dichlorophenyl)-amino]-imidazoline-(2) by Method B 11.5 gm. (0.025 mol) of N-(2",6"-dichloro-phenyl)-N - [2 - methyl-furylmethyl-3')]-S-methyl-isothiouronium iodide, prepared by reaction of 2-methyl-3-chloromethylfuran with N-(2',6'-dichloro-phenyl)-S-methyl-isothiouronium iodide, were heated together with 2.25 gm. (150 percent) of ethylenediamine for 15 minutes at 165 to 170° C. with stirring. After cooling, the reaction was worked up in the usual way whereby the desired imidazoline was obtained in a yield of 6 gm. with a melting point of 99° C. The melting point of a sample mixed with authentical material yielded no depression and was 99° C. The hydrobromide melts at 236–237° C.

EXAMPLE 32

2-[N-(2',6'-Dichloro-phenyl)-N-(β-methallyl)-amino]-imidazoline-(2) by Method B (a) N - (β - Methallyl) - N - (2',6'-dichloro-phenyl)-S-methyl-isothiouronium hydrochloride: 5.8 gm. (0.016 mol) of N - (2',6' - dichloro - phenyl)-S-methyl-isothiouronium hydrochloride, 1.3 gm. of sodium carbonate and 2.9 gm. of 3-chloro-2-methyl-propen-(1) were refluxed in 20 ml. of absolute methanol with stirring for 6 hours. After that time the reaction to the desired compound was almost complete. The inorganic salts were removed by filtration, and the filtrate was concentrated in vacuo. The compound which is a viscous oil was further reacted without purification.

(b) 2 - [N - (2',6' - Dichloro-phenyl)-N-(β-methallyl)-amino]-imidazoline-(2): The crude compound of step (a), together with 1.8 gm. of ethylenediamine, was heated for 0.25 hours at 150° C. After cooling the reaction mixture was dissolved in warm 1N hydrochloric acid, and the solution was extracted at different pH values (buffering with 2N sodium hydroxide solution) with ether. The ether fractions containing the new compound (proof by thin layer chromatography; system benzene:dioxane:conc. ammonia:ethanol=50:40:5:5 on kieselgel and colouring with potassium iodoplatinate) were combined and dried over $MgSO_4$ and distilled in vacuo. The resulting solid residue was triturated with ether, sucked off and dried in vacuo. The compound is identical with that obtained according to the process of Example 1. Yield 0.8 gm. corresponding to 17.6% of theory, m.p. 111–112° C.

EXAMPLE 33

2-[N-(2',6'-Dichloro-phenyl)-N-(β-methallyl)-amino]-imidazoline-(2) by Method B (a) N-(β-Methallyl)-N-(2',6'-dichloro-phenyl)-guanidine: 4.1 gm. (0.02 mol) of N-(2',6'-dichloro-phenyl)-guanidine, 2.9 gm. of 3-chloro-2-methyl-propene-(1) and 1.5 gm. sodium carbonate were refluxed in 30 ml. of butanol for 6 hours. After that time the reaction to the desired compound was almost complete. The reaction mixture was freed from inorganic salts by suction and was distilled in vacuo to dryness yielding crude guanidine hydrochloride. After purification via the base the hydrochloride was obtained in crystalline form in a yield of 2.3 gm. corresponding to 40% of theory.

(b) 2 - [N - (2',6' - Dichloro-phenyl)-N-(β-methallyl)-amino]-imidazoline-(2): 2.3 gm. of N-(β-methallyl)-N-(2',6'-dichloro-phenyl)-guanidine hydrochloride and 0.5 gm. of ethylenediamine were refluxed in 5 ml. of amyl alcohol for 20 hours with stirring. The solution was then filtrated, and the clear solution was evaporated in vacuo to dryness. After dissolution of the residue in 1N hydrochloric acid the solution was fractionally extracted with ether at different pH values (buffering with 2N sodium hydroxide solution). The ether fractions which contain the desired compound were combined, dried over $MgSO_4$ and freed from ether in vacuo. The imidazoline derivative thus being obtained was identical to that of Example 1. Yield 30 percent of theory.

The compounds according to the present invention, that is, those embraced by formula I above and their non-toxic, pharmacologically acceptable acid addition salts, have useful pharmacodynamic properties. More particularly, the compounds of the instant invention exhibit analgesic and hypotensive activities in warm-blooded animals, such as mice and rats.

For pharmaceutical purposes the compounds according to the present invention are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective oral dosage unit of the compounds according to the present invention is from 0.0016 to 1.34 mgm./kg. body weight, preferably 0.016 to 0.5 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 34

Tablets

The tablet composition is compounded from the following ingredients:

| | Parts |
|---|---|
| 2 - [N - (2',6' - Dichloro - phenyl)-N-(β-methallyl)-amino]-imidazoline-(2) | 10 |
| Lactose | 65 |
| Corn starch | 125 |
| Secondary calcium phosphate | 40 |
| Soluble starch | 3 |
| Magnesium stearate | 3 |
| Colloidal silicic acid | 4 |
| Total | 250 |

Preparation: The imidazoline compound is intimately admixed with part of each of the excipients except the soluble starch, the mixture is moistened with an aqueous solution of the soluble starch, granulated by forcing it through a fine-mesh screen and dried, the dry granulate is admixed with the remainder of the excipients, and the resulting composition is compressed into 250 mgm.-tablets in a conventional tablet making machine. Each tablet contains 10 mgm. of the imidazoline compound and is an oral dosage unit composition with effective analgesic and hypotensive actions.

EXAMPLE 35

Hypodermic solution

The solution is compounded from the following ingredients:

| | Parts |
|---|---|
| 2-[N-(2',6'-Dichloro-phenyl)-N-(β-methallyl)-amino]-imidazoline-(2) | 1.0 |
| Sodium chloride | 10.0 |
| Distilled water q.s.a.d. 2000.0 parts by vol. | |

Preparation: The imidazoline compound and the sodium chloride are dissolved in a sufficient amount of distilled water, the solution is diluted with additional distilled water to the indicated volume and filtered until free from suspended particles, the filtrate is filled into 2 ml.-ampules under aseptic conditions in an atmosphere of nitrogen, and the filled ampules are sterilized and sealed. Each ampule contains 1 mgm. of the imidazoline compound, and the contents thereof are an injectable dosage unit composition with effective analgesic and hypotensive actions.

EXAMPLE 36

Drop solution

The solution is compounded from the following ingredients:

| | Parts |
|---|---|
| 2-[N-(2'-Chloro-6'-methyl-phenyl)-N-(β-methallyl)-amino]-imidazoline-(2) hydrobromide | 0.02 |
| Methyl p-hydroxy-benzoate | 0.07 |
| Propyl p-hydroxy-benzoate | 0.03 |
| Demineralized water q.s.ad 100.0 parts by vol. | |

Preparation: The imidazoline compound and the benzoates are dissolved in the demineralized water, and the solution is filtered. 1 ml. of the solution (about 20 drops) contains 0.2 mgm. of the imidazoline compound and is an oral dosage unit composition with effective analgesic and hypotensive actions.

Analogous results are obtained when any one of the other imidazoline compounds embraced by formula I or a non-toxic acid addition salt thereof is substituted for the particular imidazoline compound in Examples 14 through 16. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

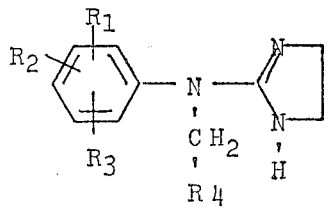

wherein $R_1$, $R_2$ and $R_3$ are each hydrogen, fluorine, chlorine, bromine, methyl, ethyl or methoxy, or one of them is trifluoromethyl or cyano while the others are hydrogen, and $R_4$ is

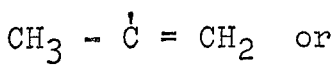 or 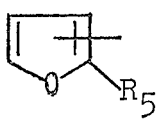

where $R_5$ is hydrogen, methyl or ethyl, or a non-toxic, pharmacologically acceptable acid addition salt thereof.

2. A compound according to claim 1, wherein
$R_1$ and $R_2$ are each hydrogen, fluorine, chlorine, bromine, methyl or ethyl,
$R_3$ is hydrogen or bromine, and
$R_4$ is

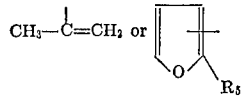

where $R_5$ is hydrogen, methyl or ethyl,
or a non-toxic pharmacologically acceptable acid addition salt thereof.

3. A compound according to claim 1, which is 2-[N-(2',6'-dichloro-phenyl) - N - (β-methallyl)-amino]-imidazoline-(2) or a non-toxic, pharmacologically acceptable acid addition salt thereof.

4. A compound according to claim 1, which is 2-[N-furfuryl-N-(2'-chloro - 6' - methyl-phenyl)amino]-imidazoline-(2) or a non-toxic, pharmacologically acceptable acid addition salt thereof.

5. A compound according to claim 1, which is 2-[N-(2'-methyl-furylmethyl-3') - N - (2'',6''-dichloro-phenyl)-amino]-imidazoline-(2) or a non-toxic, pharmacologically acceptable acid addition salt thereof.

6. A compound according to claim 1, which is 2-[N-furfuryl - N - (2',6'-dichloro-phenyl)-amino]-imidazoline-(2) or a non-toxic, pharmacologically acceptable acid addition salt thereof.

7. A compound according to claim 1, which is 2-[N-furfuryl - N - (2'-chloro-4'-methyl-phenyl)-amino]-imidazoline-(2) or a non-toxic, pharmacologically acceptable acid addition salt thereof.

References Cited

UNITED STATES PATENTS

| 2,899,426 | 8/1959 | Bloom. |
| 3,708,485 | 1/1973 | Stahle et al. |

FOREIGN PATENTS

| 623,305 | 4/1963 | Belgium | 260—309.6 |
| 1,034,938 | 7/1966 | Great Britain | 260—309.6 |

NATALIE TROUSOF, Primary Examiner

U.S. Cl. X. R.

260—309.6, 347.7, 465 E, 564 R, 564 E, 564 A; 424—253, 273